United States Patent [19]

Bruggeman

[11] 3,721,213

[45] March 20, 1973

[54] ANIMAL REARING CAGES

[75] Inventor: Frans Bruggeman, Zulzeke, Belgium

[73] Assignee: N. U. Bekaert S.A., Zwevegem, Belgium

[22] Filed: July 30, 1971

[21] Appl. No.: 167,577

[30] Foreign Application Priority Data

Aug. 7, 1970 France..................................7029271

[52] U.S. Cl.....................................................119/17
[51] Int. Cl................................................A01k 31/06
[58] Field of Search..............................119/17, 18, 19

[56] References Cited

UNITED STATES PATENTS

| | | | |
|---|---|---|---|
| 2,700,369 | 1/1955 | Kasser | 119/22 |
| 3,195,505 | 7/1965 | Hauth et al. | 119/17 |
| 3,545,406 | 12/1970 | Osborn | 119/17 |

*Primary Examiner*—Hugh R. Chamblee
*Attorney*—Edward J. Brenner et al.

[57] ABSTRACT

A cage useful for rearing animals that is constructed of a number of wire mesh panel members includes a U-shaped panel member having a central panel section and two contiguous side wall sections, two end wall panel members releasably connected to the side wall sections and having their bottom edges spaced above the level of the central panel section and their top edges spaced below the level of the top edges of the side wall sections and a floor panel member disposed above the central panel section at the same level as the bottom edges of the side wall sections and releasably connected to the side wall sections. The bottom edge of each of the end wall panel members has an offset shoulder defining a rectangular cutout at each of its ends. A U-shaped tray may be inserted into and withdrawn from the U-shaped space defined generally by the space between the U-shaped panel member, the floor panel member, and the bottom edges of the end wall panel members. A roof panel member may be disposed at the same level as the top edges of the end wall panels. A battery of rearing cages may be formed by an arrangement in which a number of the cages are stacked and/or juxtaposed together.

10 Claims, 4 Drawing Figures

PATENTED MAR 20 1973 3,721,213

ANIMAL REARING CAGES

BACKGROUND OF THE INVENTION

1. Field of the Invention

The present invention relates to rearing cages for animals and more particularly to light-weight, stackable wire mesh cages for rearing small animals.

2. Description of the Prior Art

As is shown, an increasing use is being made in the animal rearing field of the rearing method which involves placing the animals in cages which are often covered and in which the animals, whilst being limited in their movements, are supplied at regular intervals with specially prepared foodstuffs.

This method is used in particular for relatively small animals, e.g. chickens, rabbits, calves, pigletts, and the like. In such a method, use is frequently made of cages grouped into rearing batteries and which have a light weight construction based on angle irons, metal grills, profiled sections and metal sheets.

The great advantage of this rearing method is that it facilitates the work of the staff whose duty it is to feed the animals and remove animal droppings and other waste matter. In the case of large installations these operations are generally automated.

It is advantageous to make the rearing cages from light weight and readily disconnectible members, in order to facilitate storage, transportation and erection. Thus known cages are generally constructed from self-supporting panels, with or without angle irons or profiled metal sections which can be connected to one another in order to extend the batteries in height or length. However, they have the disadvantage of requiring a complicated assembly technique, and the use of angle irons and/or profiled metal sections make the cages undesirably heavy.

SUMMARY OF THE INVENTION

The present invention concerns a device useful as a rearing cage for animals which comprises a first wire mesh panel member substantially U-shaped in transverse cross-section and including a substantially uniplanar central panel adapted to form at least part of the base of the cage and two side wall panels contiguous with the base panel and disposed in substantially parallel relationship to each other and perpendicular to the plane of the central panel; a second wire mesh panel member substantially uniplanar and releasably connected at one end of the first panel member to form a first end wall for the cage; a third wire mesh panel member substantially uniplanar and releasably connected at the other end of the first panel member to form a second end wall for the cage; the bottom edges of the second and third panel members being spaced above the level of the central panel; and a fourth wire mesh panel member releasably connected to the side wall panels and disposed in parallel spaced relationship to the central panel at substantially the same level as the bottom edges of the second and third panel members, the fourth panel member being adapted to serve as a floor of the cage.

The cage device also may include a fifth wire mesh panel member which serves as a roof of the cage and a U-shaped tray which may be inserted in and withdrawn from the space between the central panel, the bottom edges of the second and third panel members and the fourth panel member. A number of cages may be stacked and/or juxtaposed together to form a battery of cages. The various parts of the cage devices of the present invention may be shipped or stored as an unassembled set of parts.

An object of the present invention is to provide an improved rearing cage which is constructed of readily connectible and disconnectible members.

A further object of the present invention is to provide an improved rearing cage design whereby a number of such cages may be readily stacked and/or juxtaposed together to form a battery of cages.

Other object and advantages of the present invention will become apparent from the following description taken in conjunction with the accompanying drawings.

DESCRIPTION OF THE PREFERRED EMBODIMENT

Figure 1:
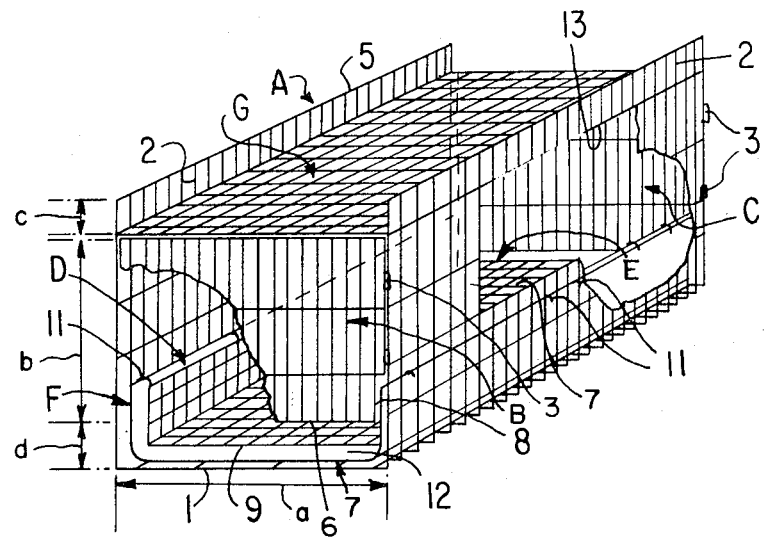
FIG. 1 is a perspective view of a cage constructed in accordance with the present invention.
Figure 2:
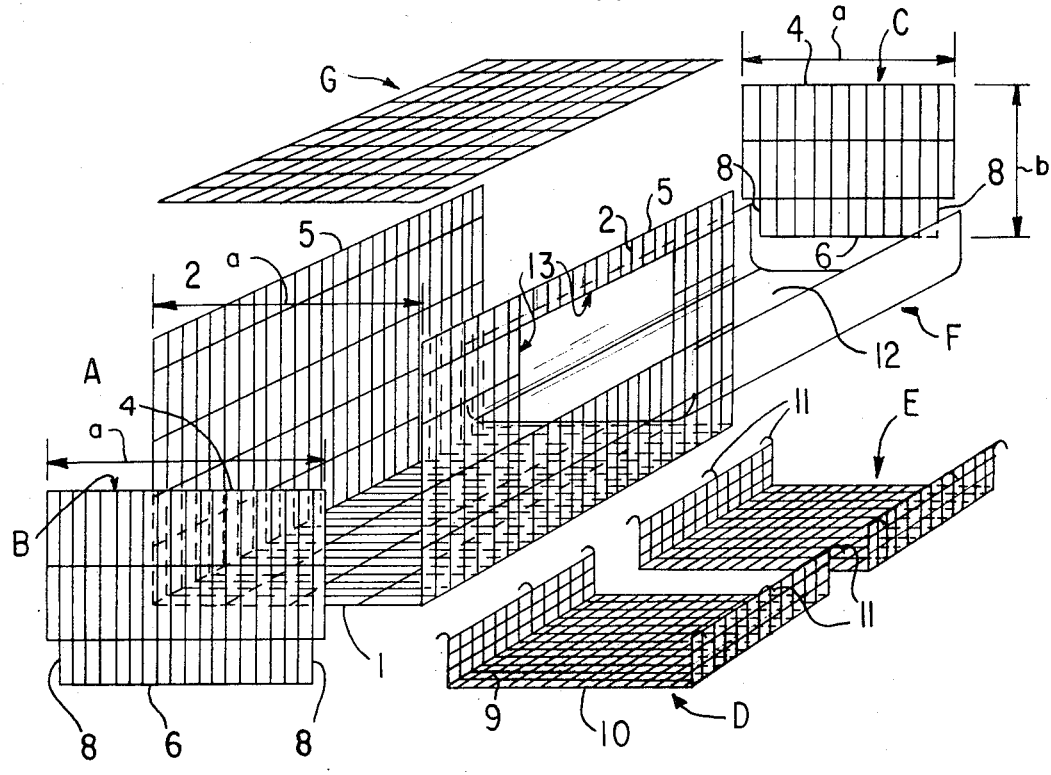
FIG. 2 is an exploded perspective view of the cage shown in FIG. 1.

FIGS. 1 and 2 show a rearing cage constructed in accordance with the present invention which is formed by a number of panel members made of welded metal wire mesh, which are interconnected in readily releasable fashion by means of hooks, clips or similar means.

The cage includes a main panel member A bent substantially into the shape of a U in transverse cross-section so as to comprise a central panel 1, which forms the base of the cage, and two contiguous side wall panels 2 which form opposite side walls of the cage.

The cage further includes two end wall panel members B and C, of which the width $a$ corresponds to that of the base 1 and the height $b$ is less than that of the side walls 2. Thus, when the end wall panel members B and C are mounted on the side walls 2 via clips 3 (see FIGS. 1 and 4), the top edges 4 (see FIG. 1) of the members B and C are at a substantial distance $c$ below the top edges 5 of the side walls 2. Also the bottom edges 6 of the members B and C are disposed at a substantial distance $d$ above the base 1, so as to provide two rectangular openings 7 at the bottoms of the respective ends of the cage. In addition, panel members B and C are recessed at their bottom corner regions at 8 by removing one mesh to provide an offset shoulder defining a cut out, for a reason which will be explained hereinafter.

The cage further includes two panel members D and E each bent in the shape of a U in transverse cross-section. The central part 9 (see FIG. 2) of each of these panel members has the same width $a$ as the base panel 1 and a length equal to half the length of the base panel 1. The panel members D and E are reinforced by rods 10 terminating in hooks 11 which suspend these panel members from the sides 2 of panel member A, at a height which is such that the central parts 9 of the panel members D and E are level with the bottom edges 6 of end panel members B and C. The panel members D and E form a floor of the cage, the space 12 between such floor and the base 1 being accessible via the aforementioned opening 7.

The cage further includes a tray F made from an impermeable and imputrescible material, such as metal or plastic, for example extruded polyethylene or bent metal sheet. The tray is substantially U-shaped in transverse cross-section and its sides have a height greater than the height D of openings 7 but less than the distance of the hooks 11 above the base 1. Thus, the tray F can be inserted into the space 12 via the recesses 8 of the end panel members B and C, its vertical sides engaging between the side wall panels 2 and the sides of the panel members D and E of the floor so as to provide protection against the excrement of animals to be housed in the cage.

The cage finally includes a panel member G forming the cage roof, which is suspended between the side wall panels 2 level with the top edges 4 of the end wall panel members B and C. The roof panel member G is thus disposed at a lower level than the top edges 5 of side wall panels 2 so that the top edge regions of the panels 2 define opposite sides of the recess on top of the cage.

Figure 3:
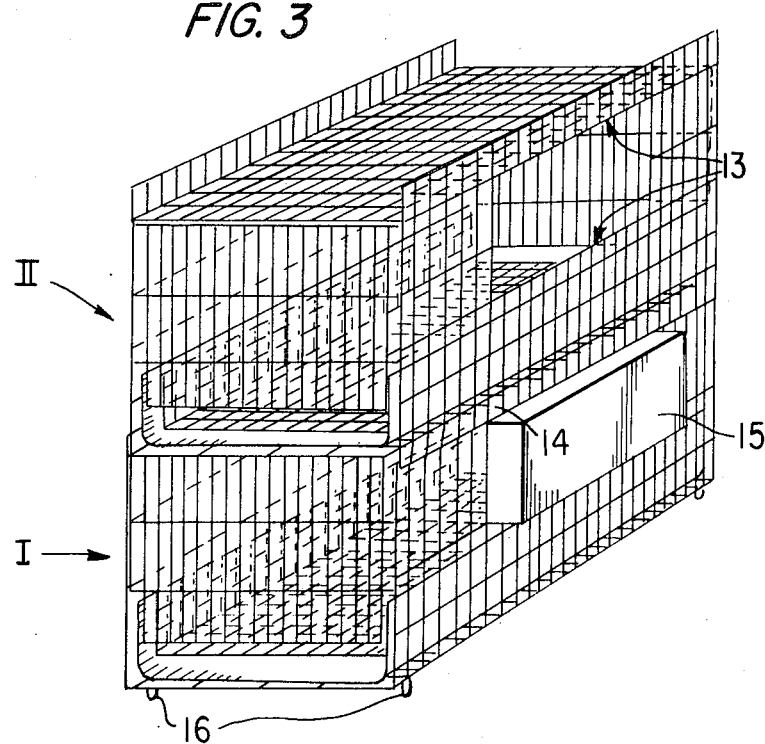
FIG. 3 is a perspective view of a battery formed by stacking two rearing cages together.

One of the side wall panels 2 of the main panel member A is formed with a rectangular opening 13 in which can be mounted a door 14 and a feed receptable 15 (see FIG. 3).

The cage shown in the accompanying drawings and constructed in accordance with the present invention has numerous advantages. In the first place it can be used as a modular element for forming rearing batteries wherein the number of superimposed and/or end-to-end juxtaposed cages is independent of the construction of the cage itself and can be freely chosen.

Figure 4:
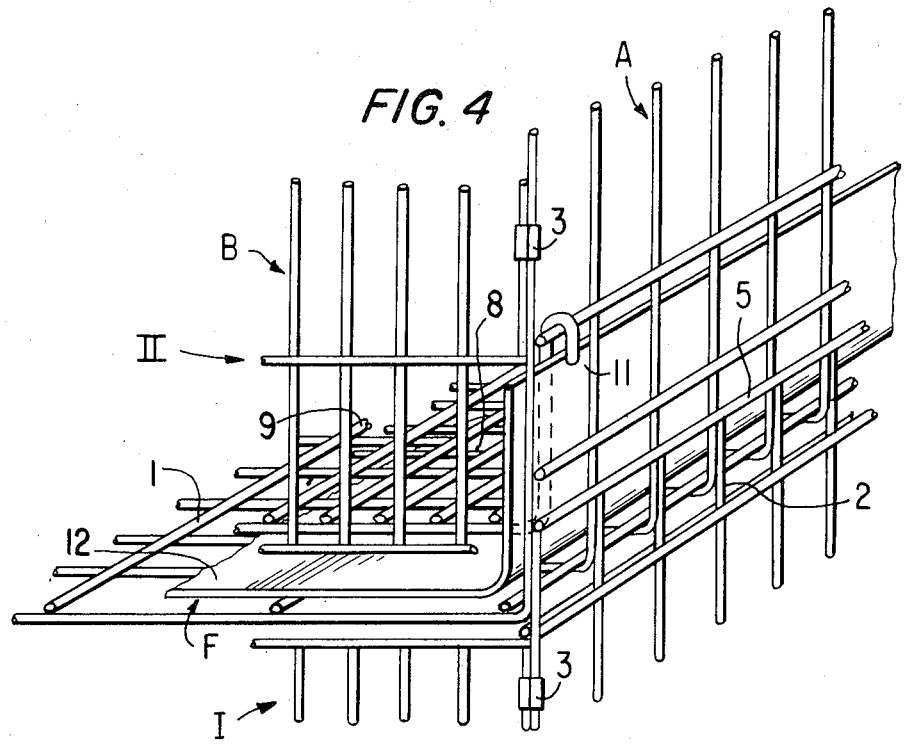
FIG. 4 is an enlarged perspective view of a portion of the assembly of the two rearing cages shown in FIG. 3.

FIGS. 3 and 4 show two superimposed cages I and II. Upper cage II engages in the recess defined between the top regions of the side wall panels 2 of lower cage I and is thus maintained in place. Its base 1 can if desired serve as the roof of the lower cage I in which case the roof G of this cage can be omitted. The lower cage can be raised above ground level by legs 16.

In the case of a row of cages juxtaposed end-to-end their trays F can be made in one piece extending the whole length of the row and can slide through the row of cages via the recesses 8 in the lower corners of the end wall panel members B and C.

Panel members A to G are of simple construction and can be transported in knocked-down packs in which those panel members which are substantially U-shaped in section can be nested in one another. The panel members can be readily assembled and disassembled requiring no particular tools other than pliers and clips.

Batteries of cages as shown in the drawings lend themselves particularly to the automatic removal of animal droppings and other waste material. The cages are of relatively light weight while at the same time having the desired rigidity and resistance to mechanical stress.

In the preferred embodiment of the present invention, the various panel members are made of welded metal wires and the cage design includes the following features. The cage is four-sided and has two end walls each formed by one of the wire mesh panel members which is releasably connected to both of the side wall panels. The bottom edges of the end wall panel members are spaced substantially above the level of said base panel and the cage includes a wire mesh panel member extending parallel to the base panel at substantially the same level as the bottom edges of the end wall panel members to form a floor of the cage. The space between the base panel and the floor panel member contains a tray for the reception of animal droppings and other waste material from within the cage. The tray is substantially U-shaped in transverse cross-section, having a floor and two upstanding side walls, each of the end wall panel members being recessed at each of its bottom corner regions to permit passage of the side walls of the tray when it is being inserted or removed. The top edges of the end wall panel members are spaced substantially below the top edges of the side wall panels to enable another and similar cage to be stacked on the cage with its base received between the top edge regions of the side wall panels. The cage includes a substantially uniplanar wire mesh panel member extending at substantially the same level as the top edges of said end wall panel members to form a roof of the cage.

The scope of the preferred embodiment of the present invention also extends to a battery of rearing cages for animals, comprising a number of cages each as described above stacked and/or juxtaposed together. Where such a battery includes a row of cages having a tray for droppings, etc., as previously described, such a tray preferably extends the whole length of the row.

Inasmuch as the present invention is subject to many modifications, variations and changes in detail, it is intended that all matter contained in the foregoing description of the preferred embodiments or shown in the accompanying drawings shall be interpreted as illustrative and not in a limiting sense.

What is claimed is:

1. A device useful as a rearing cage for animals which comprises
   a first wire mesh panel member substantially U-shaped in transverse cross-section and including a substantially uniplanar central panel adapted to form at least part of the base of said cage and two side wall panels contiguous with said base panel and disposed in substantially parallel relationship to each other and perpendicular to the plane of said central panel;
   a second wire mesh panel member substantially uniplanar and releasably connected at one end of said first panel member to form a first end wall for said cage;
   a third wire mesh panel member substantially uniplanar and releasably connected at the other end of said first panel member to form a second end wall for said cage;
   the bottom edges of said second and third panel members being spaced above the level of said central panel; and
   a fourth wire mesh panel member releasably connected to said side wall panels and disposed in parallel spaced relationship to said central panel at substantially the same level as said bottom edges of said second and third panel members, said fourth panel member being adapted to serve as a floor of said cage.

2. The invention as defined by claim 1 wherein the bottom edge of each of said second and third panel members has an offset shoulder defining a rectangular cut out at each of its ends.

3. The invention as defined by claim 2 including a tray substantially U-shaped in transverse cross-section and adapted to be inserted in and removed from the space defined generally by the space between said central panel, the bottom edges of said second and third panel members and said fourth panel member.

4. The invention as defined by claim 1 wherein the top edges of said second and third panel members are spaced below the level of the top edges of said side wall panels.

5. The invention as defined by claim 4 including a substantially uniplanar fifth wire mesh panel member disposed at substantially the same level as the top edges of said side wall panels and adapted to form a roof of said cage.

6. The invention as defined by claim 1 including a plurality of such devices stacked together to form a battery of rearing cages for animals.

7. The invention as defined by claim 3 including a row of such devices juxtaposed together to form a battery of rearing cages for animals and including a tray extending the whole length of said row.

8. A set of parts useful for constructing a rearing cage for animals which comprises a first wire mesh panel member substantially U-shaped in transverse cross-section and including a substantially uniplanar central panel adapted to form at least part of the base of said cage and two side wall panels contiguous with said base panel and disposed in substantially parallel relationship to each other and perpendicular to the plane of said central panel;

a second wire mesh panel member substantially uniplanar and releasably connectable at one end of said first panel member to form a first end wall for said cage;

a third wire mesh panel member substantially uniplanar and releasably connectable at the other end of said first panel member to form a second end wall for said cage;

the heights of said second and third panel members being less than the height of said side wall panels; and a fourth wire mesh panel member releasably connectable to said side wall panels to be disposed in parallel spaced relationship to said central panel at substantially the same level as said bottom edges of said second and third panel members, said fourth panel member being adapted to serve as a floor of said cage.

9. The invention as defined by claim 8 wherein one edge of each of said second and third panel members has an offset shoulder defining a rectangular cut out at each of its ends and said set of parts includes a tray substantially U-shaped in cross section.

10. The invention as defined in claim 8 including a substantially uniplanar fifth wire mesh panel member adapted to form a roof of said cage.

* * * * *